United States Patent [19]

Rhomberg

[11] Patent Number: 4,779,963
[45] Date of Patent: Oct. 25, 1988

[54] OPTICAL IMAGE AMPLIFIER APPARATUS

[75] Inventor: Bruno C. Rhomberg, Hausen, Switzerland

[73] Assignee: Gretag Aktiengesellschaft, Regensdorf, Switzerland

[21] Appl. No.: 51,639

[22] Filed: May 20, 1987

[30] Foreign Application Priority Data

May 30, 1986 [CH] Switzerland ............ 2208/86

[51] Int. Cl.[4] .............. G02B 26/00; G03B 21/00
[52] U.S. Cl. .................. 350/361; 350/360; 353/122
[58] Field of Search ............. 353/122; 250/213 R; 350/359, 360, 361, 340, 342; 340/794, 783; 358/62, 233, 334

[56] References Cited

U.S. PATENT DOCUMENTS

| | | | |
|---|---|---|---|
| 3,465,202 | 9/1969 | Kohashi | 250/213 R |
| 3,638,027 | 1/1972 | Koelmans | 230/213 R |
| 4,023,969 | 5/1977 | Sheridon | 346/151 |
| 4,279,000 | 7/1981 | Fukuda et al. | 358/209 |
| 4,280,756 | 7/1981 | Albertinetti | 350/360 |
| 4,519,682 | 5/1985 | Mast et al. | 353/122 |

FOREIGN PATENT DOCUMENTS

| | | |
|---|---|---|
| 301222 | 8/1954 | Switzerland . |
| 378432 | 6/1960 | Switzerland . |
| 454296 | 6/1968 | Switzerland . |

Primary Examiner—Eugene R. LaRoche
Assistant Examiner—Nathan W. McCutcheon
Attorney, Agent, or Firm—Burns, Doane, Swecker & Mathis

[57] ABSTRACT

Light emitted by a source arrives through a system of lenses and a first system of bars on the control layer of a control element. The light is reflected and refracted in keeping with local deformation of the control element nad then conducted through a concave mirror, a second bar system and a further system of lenses onto a projection surface. The image to be amplified is reproduced by means of a system of lenses on a photoelectric conducting layer in the control element. A control layer is a layer of gel and is located between two electrodes in an alternating electrical field, which may be affected by the photoelectric conducting layer. The electrode adjacent to the photoelectric conducting layer is electrically insulated relative to the photoelectric conducting layer and is in the form of a strip grid, the strips of which are connected alternatingly to one or the other pole of a source of alternating voltage. One of the poles is connected with the other electrode. An automatic switch periodically alters the polarity of the strips of the electrode grid. The alternating polarity of the strips, and the electrically insulating layout of the photoelectric conducting layer, effect an improved modulation and reduce undesirable space charge effects.

29 Claims, 5 Drawing Sheets

OPTICAL IMAGE AMPLIFIER APPARATUS

BACKGROUND OF THE INVENTION

This invention relates to an apparatus for the amplification of the intensity of an optically produced image.

One of the first of the devices designated as an optical image amplifier has been disclosed in Swiss Pat. No. 301,222. The fundamental principle of this known device includes a first system of bars placed parallel to and spaced apart from each other. The first bars are reproduced by means of a reflecting surface onto a coordinated second system of bars. The reflecting surface is placed on a control surface capable of deformation by electrostatic field forces, and which together with a photoelectric conductor layer, is located in an electrostatic field. The imge to be amplified is reproduced in a screened form on the photoelectric conductor layer, whereby the electrostatic field is locally altered in keeping with the image, and a corresponding deformation of the control layer, and thus of the mirror image, is effected. The deformed reflected image is reproduced between the bars of the second system of bars onto a projection screen upon which, a brighter image corresponding to the image to be amplified, becomes visible.

To generate the electrostatic field in this first device, two transparent homogeneous electrode surfaces are present. The electrodes are connected with the photoelectric conductor layer and the control layer, respectively, and with an electrical power source. During the illumination in keeping with the image of the photoelectric conductor layer, the electric resistance of the latter varies. By means of the variation of resistance in the longitudinal direction, i.e. parallel to the electrical field, the division of voltage between the photoelectric conductor layer and the intermediate space between it and the control layer is varied locally, whereby a corresponding deformation of the control layer, and consequently of the reflecting surface, is effected.

The utilization of the variation of the resistance of the photoelectric conductor layer in the longitudinal direction has a number of limitations. For example, to obtain a somewhat usual control effect, a relatively large minimum thickness of the photoelectric conductor layer is required, which on the other hand invokes the risk of interfering space charges.

In Swiss Pat. No. 378,432, a second optical image amplifier is disclosed wherein the limitations of the aforementioned known image amplifier are to avoided in that, rather than longitudinal, the transverse local electrical conductivity, or resistance variation of the photoelectric conductor layer, is utilized. The electrode in contact with the photoelectric conductor layer is in the form of a strip grid, wherein the electrically conducting strips located adjacent to and uniformly spaced from each other, extend orthogonally to a first system of bars and are connected in an alternating sequence with one and the other pole of the electrical power source. This electrode grid is preceded on the illumination side by an optical strip grid with the strip preferably extending at an angle of 45° relative to the electrode grid.

With this electrode configuration and layout, the potential distribution in the photoelectric conductor layer varies under illumination and the potential distribution in the layer determines exclusively the forces acting on the control layer and the mirror surface, respectively. The photoelectric conductor layer may therefore be as thin as desired, provided that electrical resistivity is not affected by a by-pass of its support. In addition, the difficulty inherent in the known longitudinal resistivity modulation of a high specific electrical resistivity of the layer is also eliminated, as the appropriate choice of the potential between the electrode strips and the thickness of the layer permits the use of any practically available value.

In spite of these improvements relative to the image amplifier operating with longitudinal modulation, the second image amplifier described above is not widely used due to certain limitations. One of the principal limitations is that with the electrode configuration using alternating polarities, an undesirable base transformation of the control layer appears, which is very much larger than the useful deformation generated by the imaging illumination. This unfavorable relationship between the base and useful deformation is equivalent to a low sensitivity and reduced efficiency of the entire layout.

An apparatus appreciably improved with respect to efficiency and short circuit sensitivity relative to the second system, is a third device disclosed in U.S. Pat. No. 4,519,682. In this apparatus all of the strips of the electrode present in the form of a strip grid, and adjacent to the photoelectric conductor layer, are at the same potential relative to the counter-electrode. The image to be amplified is projected onto the photoelectric conductor layer with the grid extending orthogonally to the bars. Optical screening of the image is effected by a reflecting grid, an absorption grid on the surface of a fiber plate, or by the photoelectric conductor layer consisting of individual strips. Furthermore, the image to be amplified may be projected in a grid form or illuminated in such a manner. The system has a very slight base deformation of the control layer and therefore possesses a relatively high sensitivity and a high efficiency.

The third device has certain limitations, however. For example, the relatively high dielectric constant of a glass support layer located above the electrode grid, causes homogenization of the electrical field, which requires relatively high voltages for a given deformation of a gel layer and a relatively large grid spacing with a given air distance between the two electrodes. Further limitations include space charge effects in the photoelectric conductor layer which lead to the burning in of the image (permanent deformation of the gel layer).

Other image amplifiers are disclosed in Swiss Pat. No. 454,296, U.S. Pat. No. 3,638,027 and U.S. Pat. No. 4,023,969. The image amplifiers known from these other references include limitations similar to those described above.

The foregoing illustrates limitations known to exist in present devices. Thus, it is apparent that it would be advantageous to provide an alternative directed to overcoming one of more of the limitations set forth above. Accordingly, a suitable alternative is provided including features more fully disclosed hereinafter.

OBJECT AND SUMMARY OF THE INVENTION

It is therefore an object of the invention to provide an optical iage amplifier which avoids the risk of interfering space charges, provides improved sensitivity and efficiency, avoids homogenization of the electrical field and avoids permanent deformation of the gel layer.

In one aspect of the present invention this is accomplished by providing apparatus for the amplification of the intensity of an optically produced image wherein a first bar system illuminated by a source of light is optically imaged on an associated second bar system by a reflecting surface. The reflecting surface is on a control layer deformable by electrical field forces. A photoelectric conducting layer, upon which the image to be amplified is reproduced affects electrical field acting on the control layer. The electrical field prevails between an electrode grid adjacent the photoelectric conducting layer on the illumination side, said electrode grid including an array of electrically conducting grid strips extending parallel to each other at uniform distances. The electrical field further comprises a counter-electrode located beyond the control layer relative to the photoelectric conducting layer including means for imaging the reflecting surface past edges of the second bar system on a projection surface. All strips of the electrode grid are at the same potential with respect to the counter-electrode, and the electrode grid and the counter-electrode are connected with a pole of an alternating voltage source. A ground electrode on one side of the electrode grid faces away from the counter-electrode. The ground electrode is located parallel to and electrically insulated from the grid. The ground electrode has the potential of the counter electrode and is essentially optically transparent.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING FIGURES

DETAILED DESCRIPTION OF THE INVENTION

Figure 1:
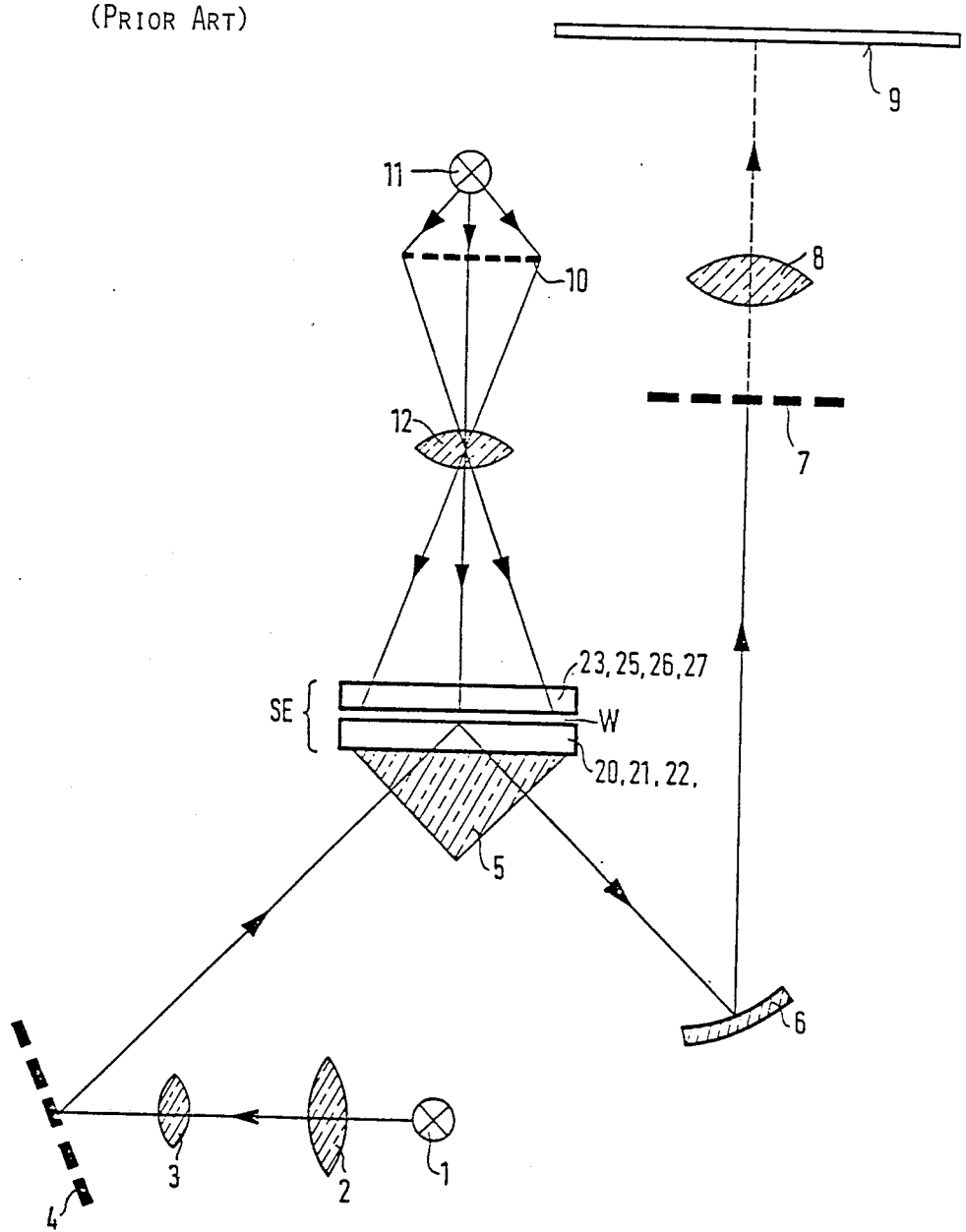
FIG. 1 is a schematic diagram illustrating the general layout of an optical image amplifier.

In an optical image amplifier, (FIG. 1) light emitted by a light source 1 arrives through two lenses or systems of lenses 2 and 3 on a first system of bars 4 and is projected by the latter through a prism 5 onto a control element SE. The light proceeds by way of a concave mirror 6 to a second bar system 7 and is finally conducted by a further lens or lens system 8 onto a projection surface 9. The image 10 to be amplified is illuminated by a light source 11 and imaged by means of a lens or lens system 12 on the photoelectric conductor layer contained in the control element SE. The longitudinal edges of the bars 4 and 7 extend perpendicularly to the plane of the drawing in FIG. 1. The apparatus of this invention is an improvement to be utilized in such optical image amplifiers.

Figure 2:
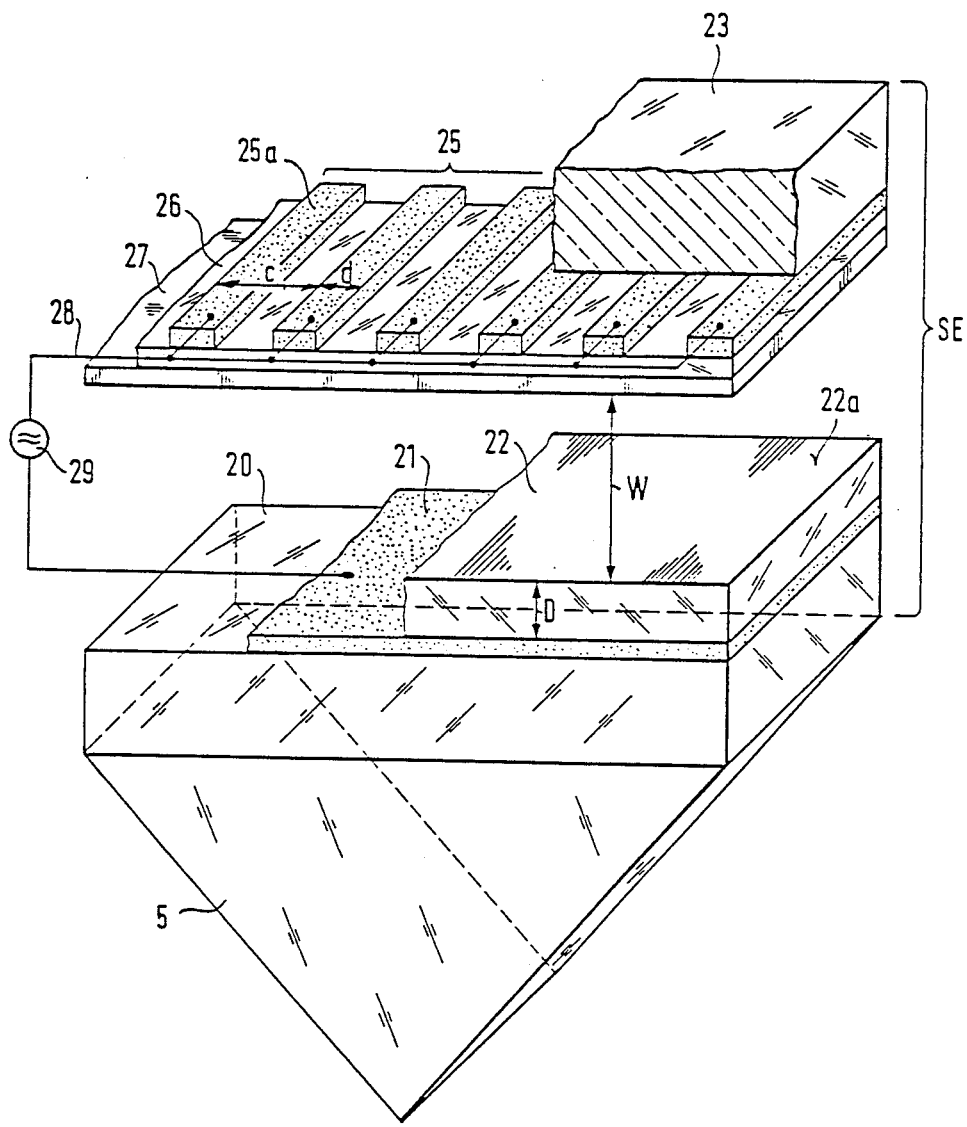
FIG. 2 is a perspective view illustrating a prior art control element.

FIG. 2 shows a known control element SE which comprises a transparent lower bottom plate 20, upon which a transparent conductivity layer 21 and the aforementioned control layer 22 are located together with a transparent upper support plate 23, on which a metallic conductive electrode grid 25, a photoelectric conductor layer 26 and a black, light impermeable and nonconducting protective layer 27, are arranged. Between the upper and the lower support plates, with their respective layers, an air gap with a width W of approximately 10–30 μm is provided.

Electrode grid 25 includes a series of transparent, electrically conducting strips 25a arranged parallel to each other at uniform distances and parallel to the longitudinal edges of the bars 4 and 7. The grid period C of electrode grid 25 is within a range of from about 50 μm to about 200 μm and is preferably as small as possible within that range. The width d of conducting strips 25a is from about 1/6 to about ¼ of grid period c, and is preferably about 1/5 of grid period c. With a practical grid period of approximately 150 μm, the width of the strips is preferably about 30 μm and the distance between two conductor strips is about 120 μm.

Individual conductor strips 25a of electrode grid 25 are interconnected at their ends by a bus bar 28 shown schematically only and connected with one pole of a power source of alternating voltage 29. The other pole of the power source 29 is connected with conductivity layer 21 on bottom plate 20 serving as the counter-electrode. The electromotive force of the power source 29 is from about 200 $V_{eff}$ to about 300 $V_{eff}$ at a frequency of from about 100 Hz to about 500 Hz, depending on the photoelectric conduction layer.

Individual conductive strips 25a of electrode grid 25 are at the same potential relative to counter-electrode 21. Without illumination, photoelectric conducting layer 26 is insulating or poorly conducting, so that between individual conducting strips there exists a quantitatively smaller potential relative to the counter-electrode than at the location of conducting strip 25a. Thus potential valleys are formed which lead to a wave shaped deformation of control layer 22, with the waves being aligned parallel to the longitudinal edges of bars 4 and 7 in keeping with the orientation of electrode grid 25. The light originating in light source 1, and totally reflected from a surface 22a of control layer 22, is deflected transversely to bars 7. The latter appears to be homogeneously brightened.

If photoelectric conducting layer 26 is homogeneously illumintted, the potentials are equalized between conducting strips 25a of electrode grid 25, and control layer 22 is not deformed. The light totally reflected by the control layer cannot pass by bars 7 and arrive on the projection screen which therefore remains dark.

The illumination of photoelectric conducting layer 26 yields a corresponding but reversed light density distribution in keeping with the image on the projection surface, wherein bright locations of image 10 to be amplified appear dark, and dark locations bright, on the projection surface.

Control layer 22 comprises an elastic-viscous material, the surface and optical properties of which may be deformed or altered by an electrical film. Preferably, the control layer is a gel layer with a thickness D of from about 30 μm to about 120 μm, preferably around 70 μm. A suitable gel is marketed by the Wacker Co., Munchen, FRG, under the designation of SIL-Gel 604.

The above described control element SE includes known limitations. These limitations are overcome by the control elements shown in FIG. 3–8 and improved according to this invention. The fundamental configuration of these control elements of the invention coincides with that of FIG. 2, so that the control elements are shown schematically only in cross section (parallel to the plane of the paper in FIG. 2). However, these sectioned views make it possible to recognize the details that are important for comprehension of the invention. The components of the control elements according to the invention that are unchanged relative to FIG. 2 are identified by the same reference symbols and will not be explained separately hereinbelow.

Figure 3:
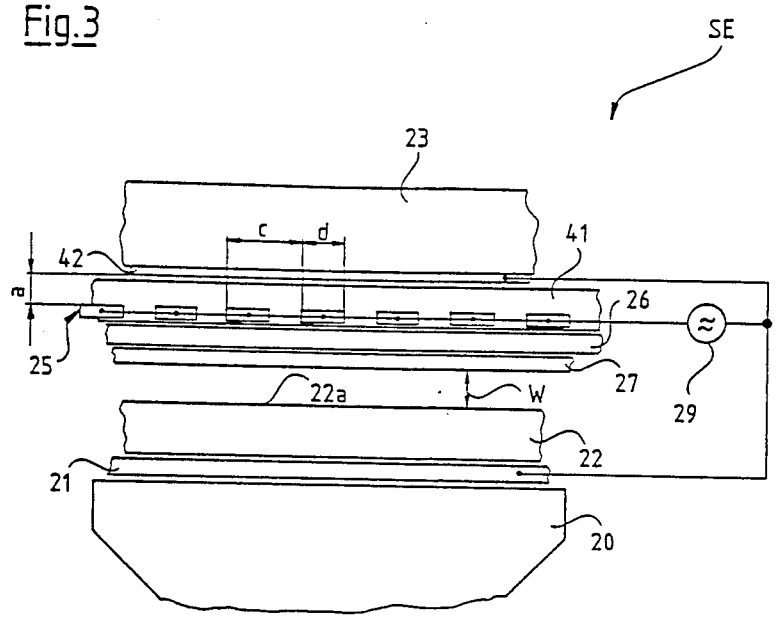
FIG. 3 is a diagrammatic view illustrating an embodiment of a control element according to the invention.

Control element SE according to FIG. 3 has, between upper support plate 23 and electrode grid 25, a continuous ground electrode 42 separated from grid 25 by an insulating layer 41, optically transparent and connected with the same pole of alternating power source 29 as is counter-electrode 21. This ground electrode reduces the homogenization effected by carrier plate 23 of the electrical field, thereby making possible the use of lower potentials and smaller grid distances with a given air distance W. The distance "a" between electrode grid 25 and ground electrode 42, is from about 5 μm to about 20 μm, preferably from about 10 μm to about 15 μm.

Figure 4:
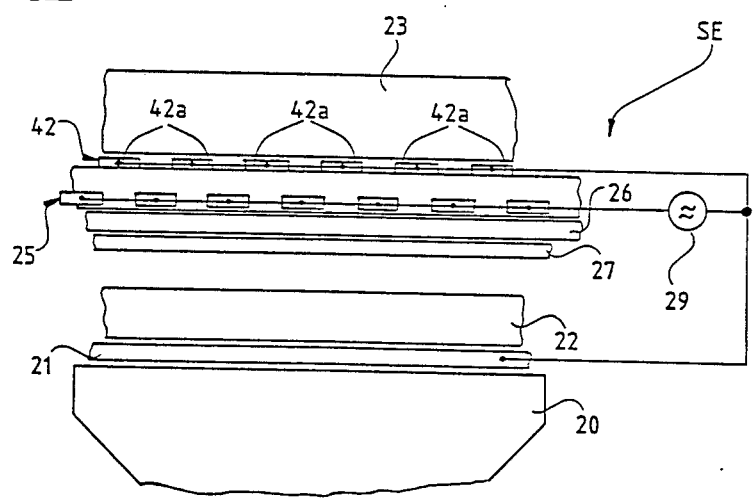
FIG. 4 is a diagrammatic view illustrating another embodiment of a control element according to the invention.

FIG. 4 shows another embodiment of control element SE of FIG. 3. Ground electrode 42 is in the form of a transparent strip grid 42 similar to electrode grid 25, wherein individual grid strips 42a are located in gaps relative to electrode grid 25. The grid strips 42a are electrically interconnected at their ends and connected with power source 29.

Figure 5:
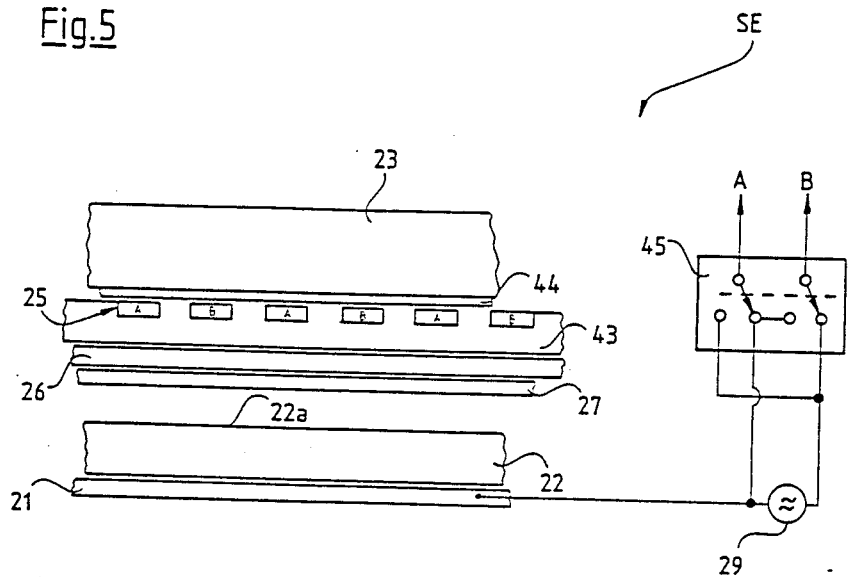
FIG. 5 is a diagrammatic view illustrating a further embodiment of a control element according to the invention together with the associated electrical components.
Figure 6:
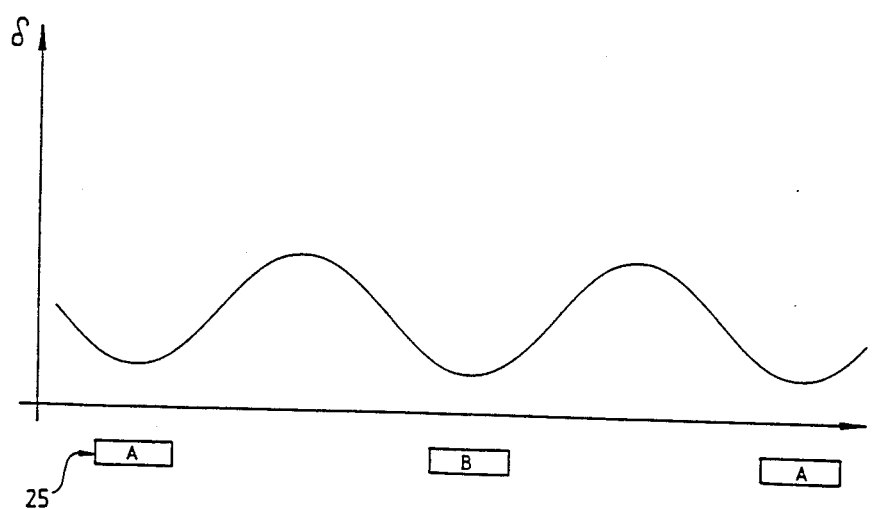
FIG. 6 is a graph illustrating an equalizing layer shown in FIG. 5.

The most essential characteristic of control element SE, shown in FIG. 5, is that photoelectric conducting layer 26 is insulated from electrode grid 25 by an insulating layer 43, and that electrically conducting strips 25a of the electrode grid are alternately connected with alternating voltage source 29, so that every other strip is at the same potential as counter-electrode 21. An equalizing layer 44 is further provided between electrode grid 25, the strips of which are designated A and B, and upper support plate 23. Layer 44 possesses the optical damping behavior shown in FIG. 6, i.e. the optical damping of this layer is weakest in the area of the grid strips A, B and strongest in between. Damping is achieved preferably by the reflectivity of the equalizing layer. Equalizing layer 44 assures, by means of damping action described, that the control light has the same control effect everywhere.

The alternating potentials of successive strips A, B of electrode grid 25 result in the fact that the potential on gel surface 22a is through modulated. Due to the absence of electrical contact between electrode grid 25 and photoelectric conductor layer 26, lower undesirable space charges are generated and the photoelectric conductor layer remains altogether neutral. Space charges in the photoelectric conducting layer tend to build up with the double space frequency of the control field. Consequently, the effect of space charges in the photoelectric conducting layer on surface 22a of control layer 22 is reduced.

The strips A, B of electrode grid 25 are preferably transparent and comprise, for example, an indium-tin oxide. In this manner, the control light may be effective under the electrode grid also, whereby Moiree effects are reduced.

Insulating layer 43 preferably comprises a high purity, temperature resistant plastic, for example polyimide, or an inorganic insulator, for example silicon dioxide or silicon nitride.

Figure 8:
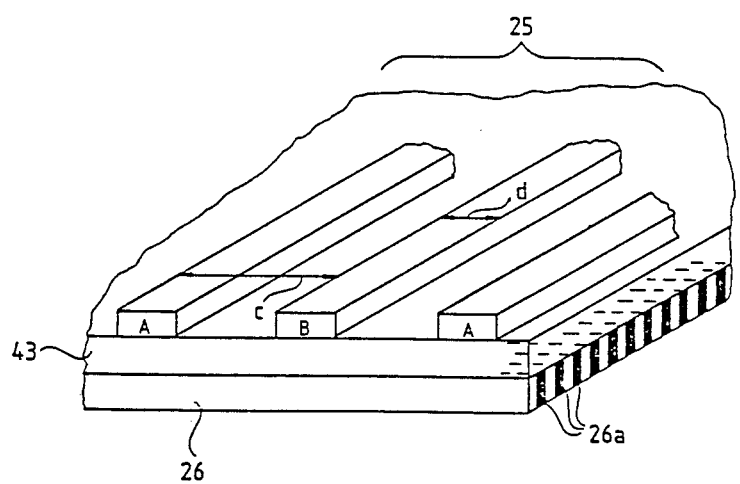
FIG. 8 is a perspective view illustrating details of a conducting layer.

Photoelectric conducting layer 26 preferably comprises amorphous or crystalline silicon. Layer 26 is advantageously interrupted by a plurality of non-conducting or poorly conducting bands 26a extending traversely to the longitudinal direction of strips A, B of electrode grid 25 (FIG. 8). With a grid period c of, for example 50 μm, bands 26a are about 1 μm wide and are spaced apart by approximately 6-7 μm. The mutual distance and the number and width of bands 26a are dimensioned so that, by their presence with a uniform illumination of photoelectric conducting layer 26, no appreciable effect on the potential on surface 22a of control layer 22 is found. The non-conducting or poorly conducting bands 26a, which may include simply of interruptions of the photoelectric conducting layer 26, limit the transport of charge carriers along strips A, B of electrode grid 25 and thus, the appearance of a phenomenon similar to the so-called "broadening" of image lines.

Opaque protective layer 27 is non-conducting or at the least has a significantly lower conductivity than photoelectric conducting layer 26 without the exposure to light (dark conductivity). Layer 27 should also have no photoelectric effect and may comprise vapor deposited pigments, pigments bound in an epoxy resin, a cermet or amorphous silicon doped with p and n in a balanced manner.

The air gap between control layer 22 and protective layer 27 is preferably filled with a gas having a high breakdown resistance, for example $SF_6$.

Gel layer 22 is preferably doped with additives which render the layer conductive without appreciably interfering with its optical properties. Examples of such additives are polyacetylenes.

Power source 29 advantageously delivers a square wave voltage. Gel layer 22 experiences a uniform force while the conductivity of conducting layer 26 is low. This is favorable for the luminous efficiency of the bright field.

It is further advantageous to provide a switching device 45, which periodically alternates the polarity of the strips A and B of electrode grid 25 (frequency 0.1 to 0.5 Hz). Consequently, gel layer 22 will not always be deformed in the same location and no plastic deformations occur. Similarly, any residual space charge effects are symmetry-sized.

To prevent interruptions in the strips A, B of the electrode grid 25 or to limit their effects, strips with similar polarity are interconnected electrically, preferably at both ends.

Between the insulating layer 43 and photoelectric conducting layer 26, or between layer 26 and protective layer 27, a thin passivating layer 46 of silicon dioxide or silicon nitride may further be provided (FIG. 7) in order to suppress potentially interfering surface effects on photoelectric conducting layer 26.

A practical example of the embodiment of control elements SE according to the invention of FIG. 5 has the following data:

Grid period c: 30 μm
Width of the insulating strips d: 6 μm
Thickness of the insulating layer 43: 5 μm
Thickness of the protective layer 27: 3 μm
Thickness of the photoelectric conductive layer 26: 0.7 μm
Air distance W: 20 μm
Thickness of the gel layer 22: 40 μm The transparent electrodes preferably comprise indium-tin oxide. All other data, if not cited otherwise, are according to the state of the art discussed above.

Figure 7:
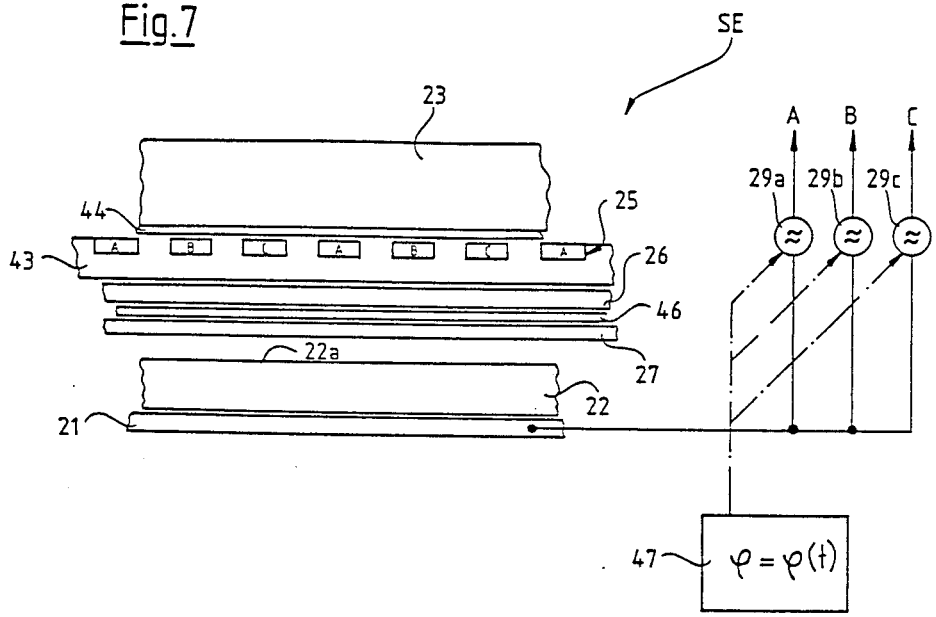
FIG. 7 is a diagrammatic view illustrating a still further embodiment of a control element according to the invention with the associated electrical elements.

FIG. 7 shows a further embodiment of control element SE according to the invention, which essentially differs from the embodiment of FIG. 5 in that the strips designated A, B and C of electrode grid 25 are connected in a cyclically alternating manner with a pole of each of three different sources of alternating voltage 29a–c, the other pole being connected with counter-electrode 21 (ground, reference potential). Otherwise, this embodiment corresponds in every detail to the embodiment of FIG. 5. A phase shifter stage 47 is further provided.

The three alternating voltage sources 29a–c produce three identical amplitude modulated alternating currents, the modulating functions of which are offset in phase by 120° each, according to the following formulas:

$$u_a(t) = U_o \cdot \cos \omega t \cdot [k + \cos(\phi_o)]$$

$$u_b(t) = U_o \cdot \cos \omega t \cdot [k + \cos(\phi_o + 120°)]$$

$$u_c(t) = U_o \cdot \cos \omega t \cdot [k + \cos(\phi_o - 120°)]$$

Here, $u_a(t)$, $u_b(t)$, $u_c(t)$ are the instantaneous voltages, $U_o$, the apex value of the amplitude, $\omega$, the frequency $\phi_o$, the phase of the modulation, and k, a parameter between 0 and $\geq 1$, in actual practice preferably k=1.

The advantage of this three-phase actuation of the electrode grid 25 is that the location of the greatest deformation of the control layer 22 is no longer bound to the grid, but may be set electrically by means of the modulation phase $\phi_o$. If $\phi_o$ is for example 0, the location of the greatest deformation of the gel layer is at the location of grid strip A. At $\phi_o = -60°$, it is between strips A and B. Depending on $\phi_o$, it may pass through all of the points from strip A to strip C.

By means of the appropriate variation in time of modulation phase $\phi_o$, gel layer 22 may, averaged over time, be exposed uniformly in all locations, whereby permanent deformations are avoided. With a suitable selection of k (for example k=1), this shift may be effected in a manner such that the gel deformation is never zero.

The variation in time of the modulation phase $\phi_o$ is carried out by phase shift stage 47 so that $\phi_o$ with a frequency of for example 0.5 to 50 Hz, passes periodically through all possible values from 0° to 360°. In this manner, "migrating waves" may be produced in gel layer 22, which improve the resolution and average the Moiree effects over time, thereby suppressing them.

In this embodiment of the invention a grid period c of 20 μm with a width d of the grid strips of 5 μm has been found to be appropriate. All other data and structural characteristics are identical, as in the example of the embodiment of FIG. 5, with those of the known devices of this type, if not specified otherwise.

What is claimed is:

1. Apparatus for the amplification of the intensity of an optically produced image, wherein a first bar system illuminated by a source of light is optically imaged on an associated second bar system by means of a reflecting surface, said reflecting surface being on a control layer deformable by electrical field forces, a photoelectric conducting layer upon which an image to be amplified is reproduced and which is affecting an electrical field acting on the control layer, said electrical field being between an electrode grid adjacent the photoelectric conducting layer on an illumination side, said electrode grid including an array of electrically conducting grid strips extending parallel to each other at uniform distances therebetween, a counter-electrode located beyond the control layer relative to the photoelectric conducting layer including means for imaging the reflecting surface past an edge of the second bar system on a projection surface, wherein all strips of the electrode grid are at the same potential with respect to the counter-electrode and the electrode grid and the counter-electrode are respectively connected with opposite poles of an alternating voltage source, a ground electrode on one side of the electrode grid facing away from the counter-electrode, said ground electrode being located parallel to and electrically insulated from the electrode grid, having the potential of the counter electrode and being essentially optically transparent.

2. The apparatus of claim 1, wherein said grid and said ground electrode are separated by a distance of from about 5 μm to about 20 μm.

3. Apparatus of claim 2, wherein said grid strips extend parallel to each other defining uniform gaps therebetween.

4. Apparatus of claim 3, wherein said ground electrode includes a plurality of electrode strips, said electrode strips extending parallel to each other defining uniform gaps therebetween.

5. Apparatus of claim 4, wherein said grid strips are opposite to said gap between said electrodes strips.

6. Appartus of claim 4, wherein said electrode strips are of the same electrical potential.

7. Apparatus for the amplification of the intensity of an optically produced image, wherein a first bar system illuminated by a light source is optically imaged on an associated second bar system by means of a reflecting surface being on a control layer deformable by electric field forces, a photoelectric conducting layer upon which an image to be amplified is reproduced and which affects an electrical field acting on the control layer, said electrical field prevailing between an electrode grid adjacent an illumination side of the photoelectric conducting layer, said electrode grid comprising an array of electrically conducting grid strips extending parallel to each other at uniform distances therebetween, a counter-electrode located beyond the control layer relative to the photoelectric conducting layer including means for imaging the reflecting surface past an edge of the second bar system on a projection surface, the electrode grid being electrically insulated with respect to the photoelectric conducting layer, the grid strips including successive strips A and B having alternating electrical potential, an alternating voltage source having first and second poles, said counter electrode being connected with said first pole of said voltage source, and means alternatingly connecting said strips A and B with said first and second poles and alternatingly reversing these interconnections.

8. Apparatus for the amplification of the intensity of an optically produced image, wherein a first bar system illuminated by a light source is optically imaged on an associated second bar system by means of a reflecting surface, said reflecting surface being on a control layer deformable by electric field forces, a photoelectric conducting layer upon which an image to be amplified is reproduced and which affects an electrical field acting on the control layer, said electrical field prevailing between an electrode grid adjacent an illumination side of the photoelectric conducting layer, said electrode grid comprising an array of electrically conducting grid strips extending parallel to each other at uniform distances therebetwen, a counter-electrode located beyond the control layer relative to the photoelectric conducting layer including means for imaging the reflectiong surface past an edge of the second bar system on a projection surface, the electrode grid being electrically insulated with respect to the photoelectric conducting layer, the grid strips including successive strips A, B and C having cyclically alternating electrical potential; first, second and third sources of alternating voltage sources each having first and second poles, means for connecting the first poles of said alternating voltage sources to said counter electrode, means for connecting the second poles of said alternating voltage sources to said strips A, B and C, respectively, and means for modulating said alternating voltage sources according to:

$$u_i(t) = U_o \cdot \left\{ k + \cos\left[ \phi(t) + \frac{2\pi \cdot i}{3} \right] \right\} \cdot \cos \omega t$$

wherein i is an index $1 \leq i \leq 3$, $u_i(t)$ are the instantaneous voltages of said first, second and third alternating voltage sources, $U_o$ is the apex value of the amplitude, $\omega$ is the frequency of the voltages, $\phi(t)$ is the phase of modulation and k is a parameter $0 \leq k \leq 1$.

9. Apparatus of claim 8, wherein said electrode grid is optically transparent and is formed of induim-tin oxide.

10. Apparatus of claim 9, wherein said electrode grid includes a side facing away from said counter electrode.

11. Apparatus of claim 10, including:
an equalizing layer on said side facing away, said equalizing layer providing a first level of optical damping for strips A, B and C, and a second level of optical damping, greater than said first level, between strips A, B and C.

12. Apparatus of claim 11, wherein the equalizing layer includes a locally differing reflectivity effecting a locally differing damping of light.

13. Apparatus of claim 12, wherein the electrode grid is electrically insulated by an insulating layer of high purity, heat resistant plastic.

14. Apparatus of claim 13, wherein the plastic is polyimide.

15. Apparatus of claim 12, wherein the electrode grid is electrically insulated by an insulating layer of inorganic material.

16. Apparatus of claim 15, wherein the inorganic material is silicon dioxide.

17. Apparatus of claim 15, wherein the inorganic material is silicon nitride.

18. Apparatus of claim 12, wherein the photoelectric conducting layer is formed of amorphous silicon.

19. Apparatus of claim 12, wherein the photoelectric conducting layer is formed of crystalline silicon.

20. Apparatus of claim 8, wherein the photoelectric conducting layer is interrupted by a plurality of relatively narrow nonconducting paths extending perpendicularly to strips A and B for limiting movement of charge carriers along strips A and B.

21. Apparatus of claim 20, including:
an opaque black layer between the photoelectric conducting layer and the control layer.

22. Apparatus of claim 21, including:
a gas having a high breakdown resistance between the control layer and the black layer and between the black layer and the photoelectric conducting layer.

23. Apparatus of claim 22, wherein said control layer includes a layer of a gel doped with additives maximizing the refractive index without reducing transparency.

24. Apparatus of claim 22, wherein the control layer includes a gel doped with additives, whereby the gel includes optical and conductive properties.

25. Apparatus of claim 8, wherein said alternating voltage source yields a square wave voltage.

26. Apparatus of claim 25, including:
a passivating layer of silicon dioxide immediately adjacent the photoelectric conducting layer.

27. Apparatus of claim 25, including:
a passivating layer of silicon nitride immediately adjacent the photoelectric conducting layer.

28. Apparatus of claim 25, including:
means for suppressing interfering surface effects on the photoelectric conducting layer.

29. Apparatus for the amplification of the intensity of an optically produced image, comprising:
a first plate;
a counter electrode and a control layer sequentially provided on said first plate;
a second plate parallel to and spaced from about 10 μm to about 30 μm from said first plate;
a conductive electrode grid including electrically conducting strips, a photoelectric conducting layer and a light impermeable, nonconducting protective layer sequentially provided on said second plate, said control layer and said nonconducting protective layer being adjacent said space, said grid including a side facing away from said counter electrode;
a power source having one pole electrically connected to said strips and another pole electrically connected to said counter electrode; and
an optically transparent ground electrode on said side facing away from said counter electrode, said ground electrode being parallel to and electrically insulated from said grid, and said ground electrode and said counter electrode having substantially the same electrical potential.

* * * * *